US008222552B2

(12) United States Patent
Kim et al.

(10) Patent No.: US 8,222,552 B2
(45) Date of Patent: Jul. 17, 2012

(54) RUN/TEST POSITION INDICATOR DEVICE OF VACUUM CIRCUIT BREAKER

(75) Inventors: Hyun Jae Kim, Chungcheongbuk-Do (KR); Kil Young Ahn, Daejeon (KR)

(73) Assignee: LS Industrial Systems Co., Ltd., Gyeonggi-Do (KR)

(*) Notice: Subject to any disclaimer, the term of this patent is extended or adjusted under 35 U.S.C. 154(b) by 163 days.

(21) Appl. No.: 12/718,262

(22) Filed: Mar. 5, 2010

(65) Prior Publication Data
US 2010/0230258 A1  Sep. 16, 2010

(30) Foreign Application Priority Data
Mar. 11, 2009  (KR) .................... 20-2009-0002810 U

(51) Int. Cl.
*H01H 9/00* (2006.01)
(52) U.S. Cl. ...................................................... 200/308
(58) Field of Classification Search .................. 200/308, 200/50.26, 400, 401
See application file for complete search history.

(56) References Cited

U.S. PATENT DOCUMENTS

| 4,135,072 | A | * | 1/1979 | Maier et al. | 200/308 |
| 5,337,210 | A | * | 8/1994 | Ishikawa et al. | 361/608 |
| 5,973,278 | A | * | 10/1999 | Wehrli et al. | 200/308 |
| 6,472,620 | B2 | * | 10/2002 | Rane et al. | 200/50.26 |
| 6,476,335 | B2 | * | 11/2002 | Letient | 200/50.26 |
| 6,563,062 | B2 | * | 5/2003 | Kurano et al. | 200/50.24 |
| 6,788,172 | B1 | * | 9/2004 | Godesa et al. | 335/17 |
| 7,847,203 | B2 | * | 12/2010 | Narayanan et al. | 200/50.26 |
| 2004/0212943 | A1 | | 10/2004 | Yoon | |
| 2009/0014292 | A1 | | 1/2009 | Lyu | |
| 2009/0015990 | A1 | | 1/2009 | Kim et al. | |

FOREIGN PATENT DOCUMENTS

| CN | 101165981 | 4/2008 |
| JP | 44-022831 | 9/1969 |
| JP | 61-062511 | 4/1986 |
| JP | 10-201020 | 7/1998 |
| JP | 11-146514 | 5/1999 |
| JP | 2008-104345 | 5/2008 |

OTHER PUBLICATIONS

Japanese Office action, dated Feb. 21, 2012 along with an English language translation thereof.
Chinese Office action, dated May 2, 2012 along with an English language translation thereof.

* cited by examiner

*Primary Examiner* — Edwin A. Leon
(74) *Attorney, Agent, or Firm* — Greenblum & Bernstein P.L.C.

(57) ABSTRACT

A run/test position indicator device of a vacuum circuit breaker includes: a position indication cam installed between a girder, a fixed body, and a main body of a carriage, a moving body, and rotating at a certain angle according to a change in the space between the girder and the main body of the carriage; and an indication member, to which the position indication cam is rotatably coupled, having a mark symbol to allow the position indication cam to indicate a run and test position of a main body of circuit breaker.

16 Claims, 5 Drawing Sheets

RUN/TEST POSITION INDICATOR DEVICE OF VACUUM CIRCUIT BREAKER

The present disclosure relates to subject matter contained in priority Korean Application No. 20-2009-0002810, filed on Mar. 11, 2009, the disclosure of which is herein expressly incorporated by reference in its entirety.

BACKGROUND OF THE INVENTION

1. Field of the Invention

The present invention relates to a run/test position indicator device of a vacuum circuit breaker and, more particularly, to a run/test position indicator device of a vacuum circuit breaker capable of quickly and accurately recognizing the location of a vacuum circuit breaker moving in a cradle device configured to receive the vacuum circuit breaker.

2. Description of the Related Art

In general, a vacuum circuit breaker is classified into a withdrawal type vacuum circuit breaker and a fixed type vacuum circuit breaker. Namely, the fixed type circuit breaker is configured to have only a main body whose position is fixed in a distributing board panel, and a withdrawal/insertion circuit breaker configured to have an outer box called a cradle facilitating a maintenance and repair of a circuit breaker so that only a circuit breaker main body can be withdrawn and inserted.

Here, the withdrawal/insertion vacuum circuit breaker is employed in a distributing board in which various electric devices including a circuit breaker are disposed and managed to operate or control a power station and a transformer substation or operate an electromotor, and the like. Also, the vacuum circuit breaker is received in a cradle fixed in the distributing board and used, and has a run position at which a main line and a load terminal of the circuit breaker are connected with a main line and a load terminal of the cradle to allow voltage and current to be supplied and a test position at which the main line and the load terminal of the circuit breaker are separated from the terminals of the cradle and only an operation test of the breaker is available.

In order for an operator to move the main body of the vacuum circuit breaker to the test position with respect to the cradle, the operator must lift up an interlock link provided at the main body and push the circuit breaker to allow the interlock link to be mounted in a test position determining recess of an interlock plate provided at the cradle. At the position, the main line and the load terminal of the circuit breaker are separated from the main link and the load terminal of the cradle, and only an operation test of the vacuum circuit breaker can be performed. In this case, the operator may discriminate a corresponding position upon seeing a test position character of an indication sticker positioned on an upper surface of the interlock plate of the cradle.

Also, the operator may connect the main line and the load terminal of the vacuum circuit breaker to the main line and the load terminal of the cradle to change from the test position of the vacuum circuit breaker to the run position at which current is supplied to the circuit breaker. In this case, the operator may lift up the interlock link to separate it from the test position determining recess, and push the main body of the circuit breaker toward the cradle terminal to move the circuit breaker. As the interlock link is received in the operation position determining recess of the cradle, the circuit breaker is at the operation position in the cradle. After the main body of the circuit breaker has been changed to be at the operation position, the operator can discriminate the corresponding position upon seeing an operation position character of the indication speaker positioned on the upper surface of the interlock plate of the cradle.

Here, the main body of the vacuum circuit breaker includes a plurality of contactors, a vacuum interruptor, and the like, that can be brought into contact with the main line terminal and the load terminal of the cradle, and further includes a main circuit unit for making the main line side and the load side interrupted in the occurrence of an accident current, a driving unit for driving the main circuit unit, and a carriage unit for moving the main circuit unit and the driving unit.

The related art cradle and vacuum circuit breaker has the character sticker attached on the upper surface of the interlock plate of the cradle to indicate a corresponding position, and in a state that the operator has moved the vacuum circuit breaker to the corresponding position (run or test position), he can discriminate the location of the circuit breaker upon seeing the character sticker attached at the position, causing a problem in that it is not easy for the operator to quickly and accurately recognize the location of the vacuum circuit breaker.

SUMMARY OF THE INVENTION

Therefore, in order to address the above matters, the various features described herein have been conceived.

An aspect of the present invention provides a run/test position indicator device of a vacuum circuit breaker capable of quickly and accurately recognizing the location of a vacuum circuit breaker.

According to an aspect of the present invention, there is provided a run/test position indicator device of a vacuum circuit breaker, including: a position indication cam installed between a girder, a fixed body, and a main body of a carriage, a moving body, and rotating at a certain angle according to a change in the space between the girder and the main body of the carriage; and an indication member, to which the position indication cam is rotatably coupled, having a mark symbol to allow the position indication cam to indicate a run and test position of a main body of circuit breaker.

Here, the position indication cam may be configured to be rotated in units of certain intervals along a lengthwise direction.

The position indication cam may include a guiding unit for constraining a rotation by the main body of the carriage, and the guiding unit may include a plurality of first guiding units formed along a lengthwise direction of the position indication cam and one or more second guiding units formed between the first guiding units and slopingly connecting the first guiding units such that they have a phase difference.

A cam holder may be coupled with the main body of the carriage, in which the guiding unit of the position indication cam is inserted to allow the position indication cam to be slidably rotated.

The cam holder may include a sliding part formed in a penetrating manner to allow the position indication cam to be inserted and slid, and a restraining part may be formed on an inner circumferential surface of the sliding part and coupled with the guiding unit of the position indication cam to restrain a rotation. The cam holder may include a fixed part hook-coupled to the main body of the carriage.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5 to 7 illustrate the operations of the run/test position indicator device in FIG. 1, wherein FIG. 5 is a schematic view showing a 'TEST' state, FIG. 6 is a schematic view showing a 'RACK' state, and FIG. 7 is a schematic view showing a 'RUN' state.

DETAILED DESCRIPTION OF THE INVENTION

Figure 1:
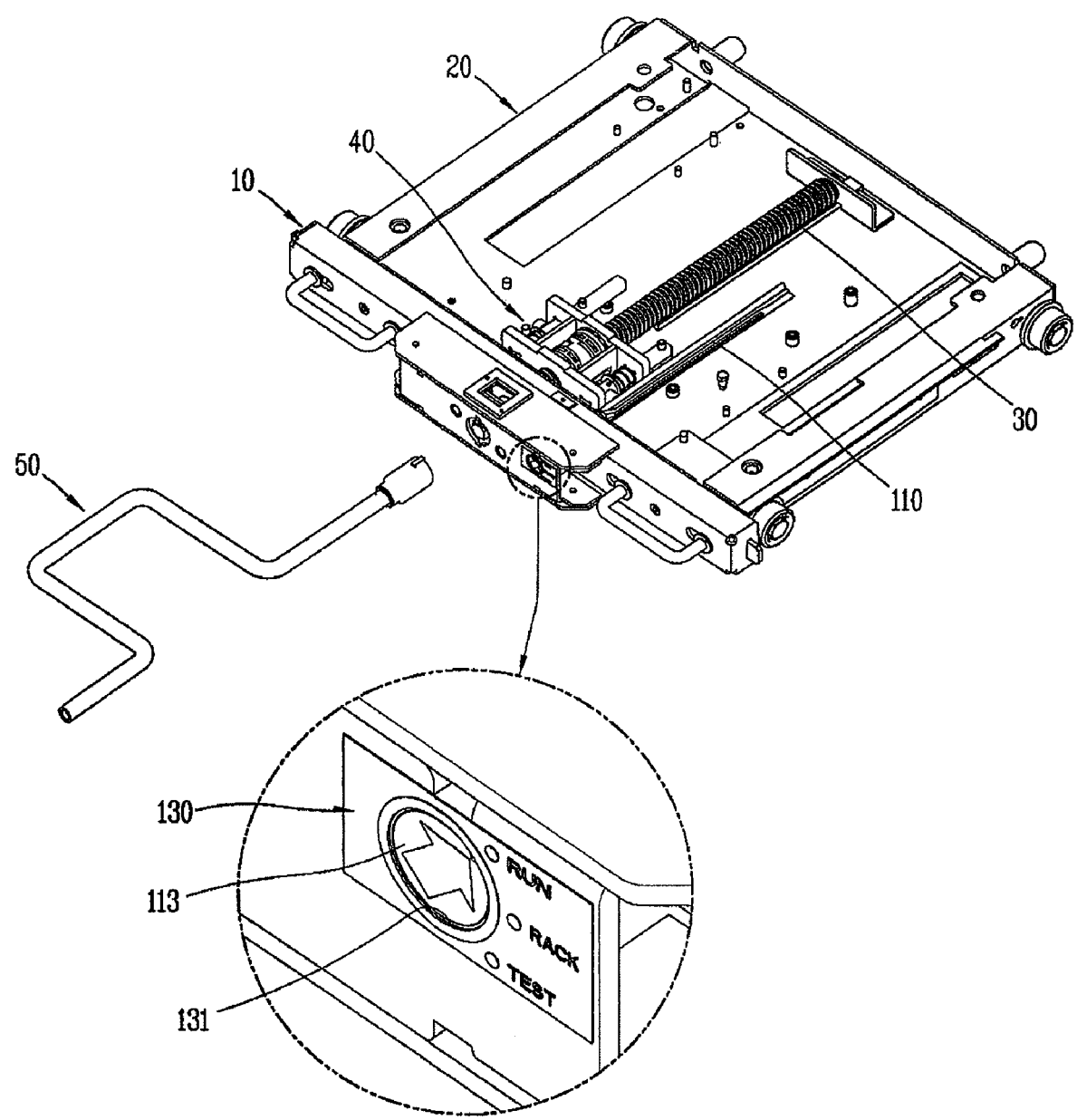
FIGS. 1 and 2 are perspective views showing a carriage including a run/test position indicator device according to an exemplary embodiment of the present invention.

A run/test position indicator device of a vacuum circuit breaker according to exemplary embodiments of the present invention will now be described with reference to the accompanying drawings. The thickness of lines or the size of constituents illustrated in the drawings may be exaggerated to emphasize distinct explanation and elements indicated by like reference numerals in the figures mean like elements. Also, the terms used in the present application are defined in consideration of the function of the present invention, which may vary according to an intention of a user or an operator or according to custom. Thus, definition of such terms should be made based on content throughout the specification.

As the present invention allows for various changes and numerous embodiments, particular embodiments will be illustrated in drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

Figure 2:
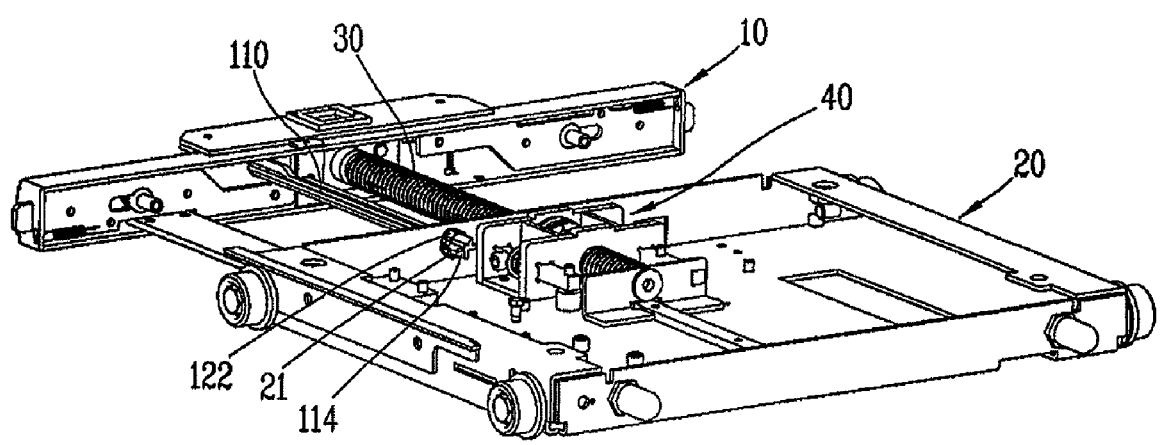
Figure 3:
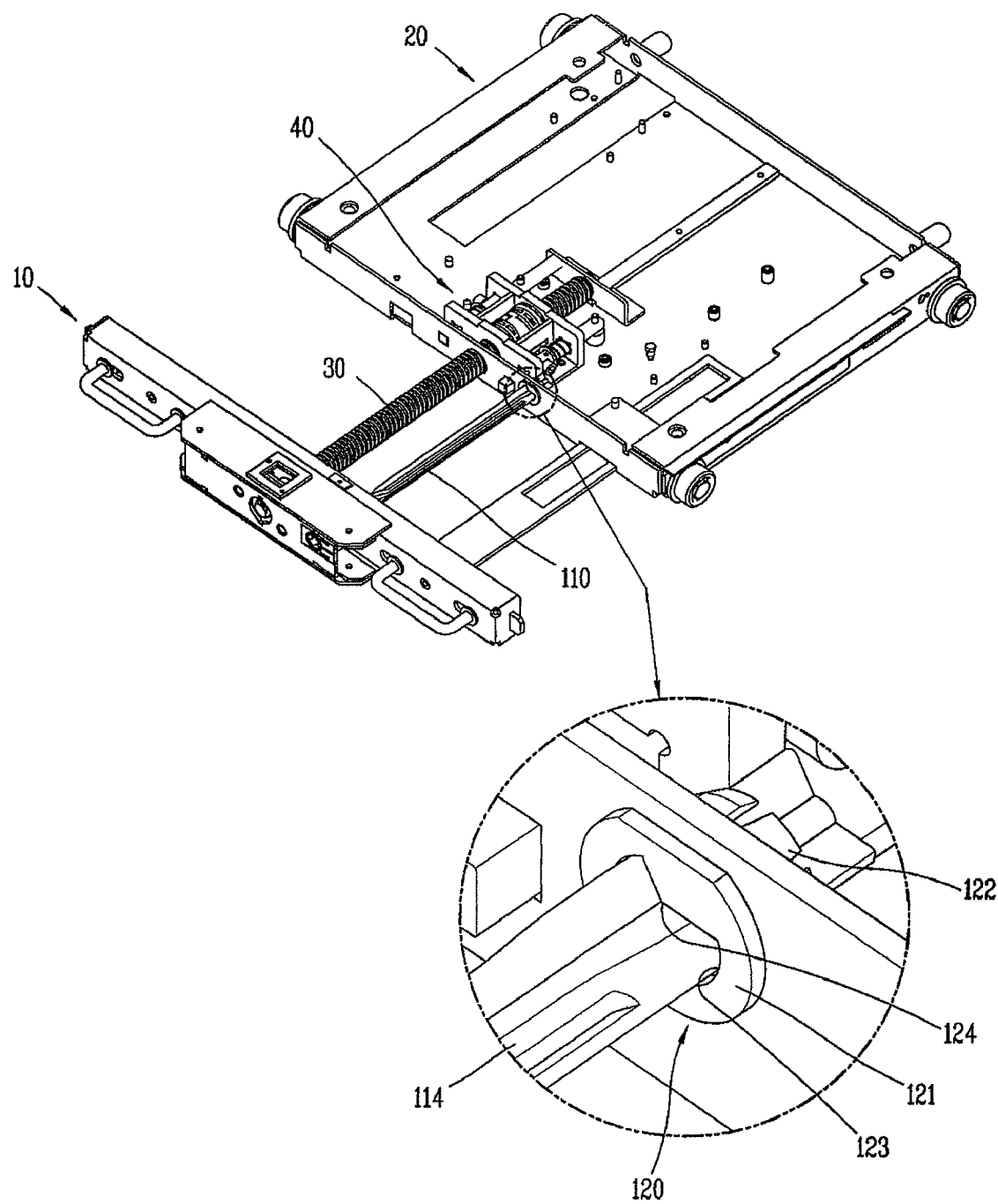
FIG. 3 is a perspective view showing a state of the run/test position indicator device when the main body of the carrier becomes away from a girder.
Figure 4:
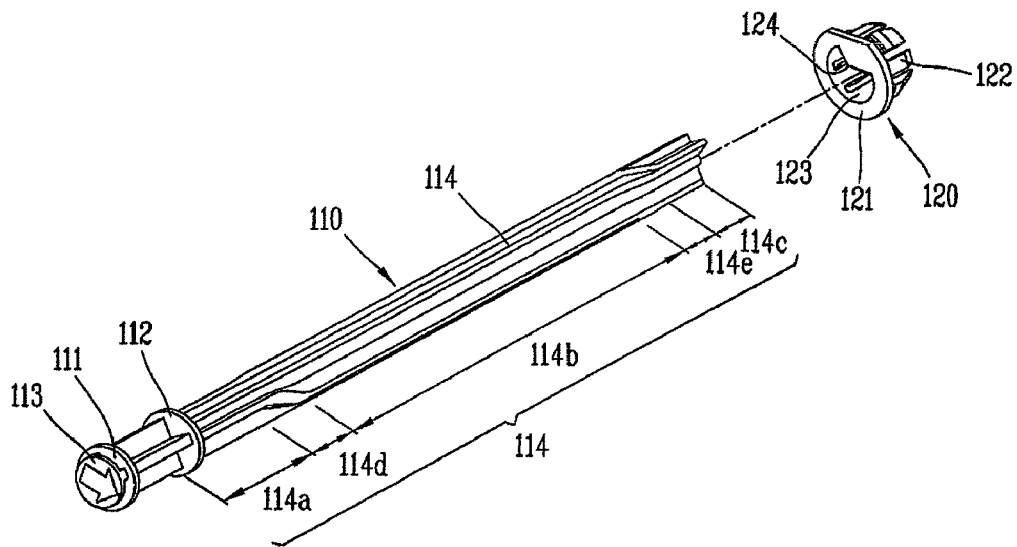
FIG. 4 is an exploded perspective view of a major part of the run/test position indicator device in FIG. 1.
Figure 5:
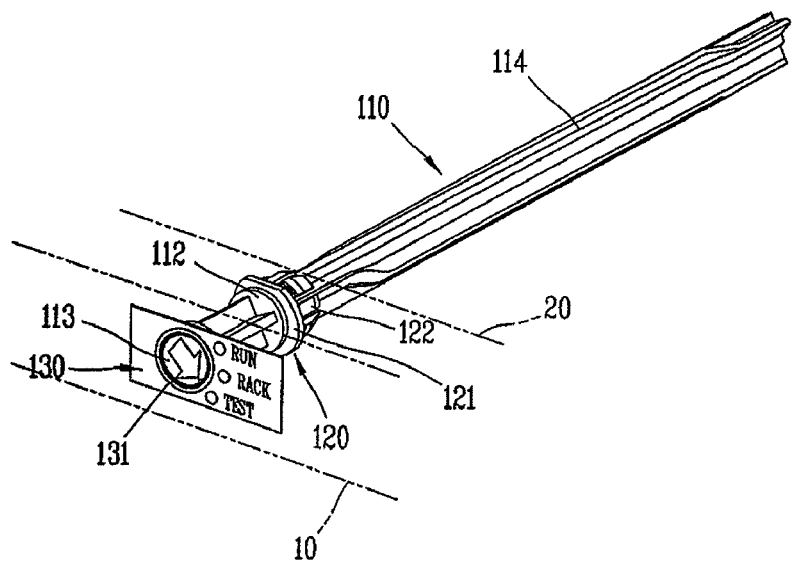
Figure 6:
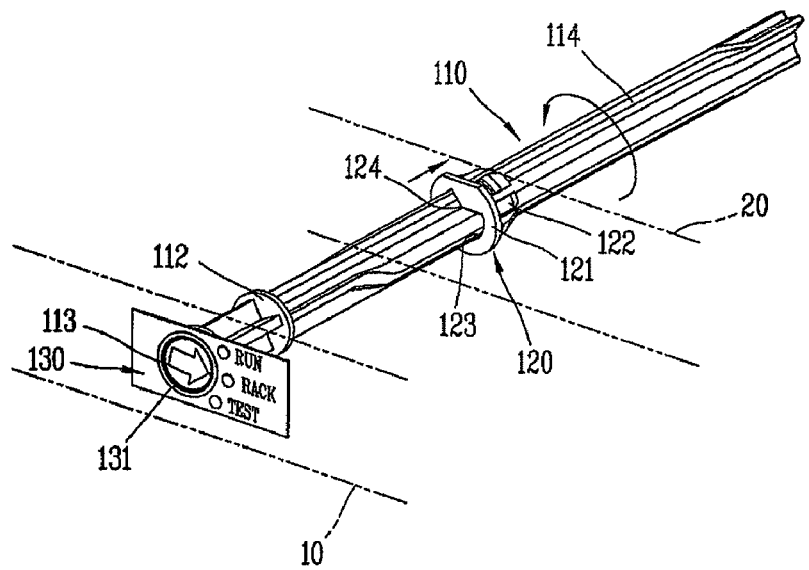
Figure 7:
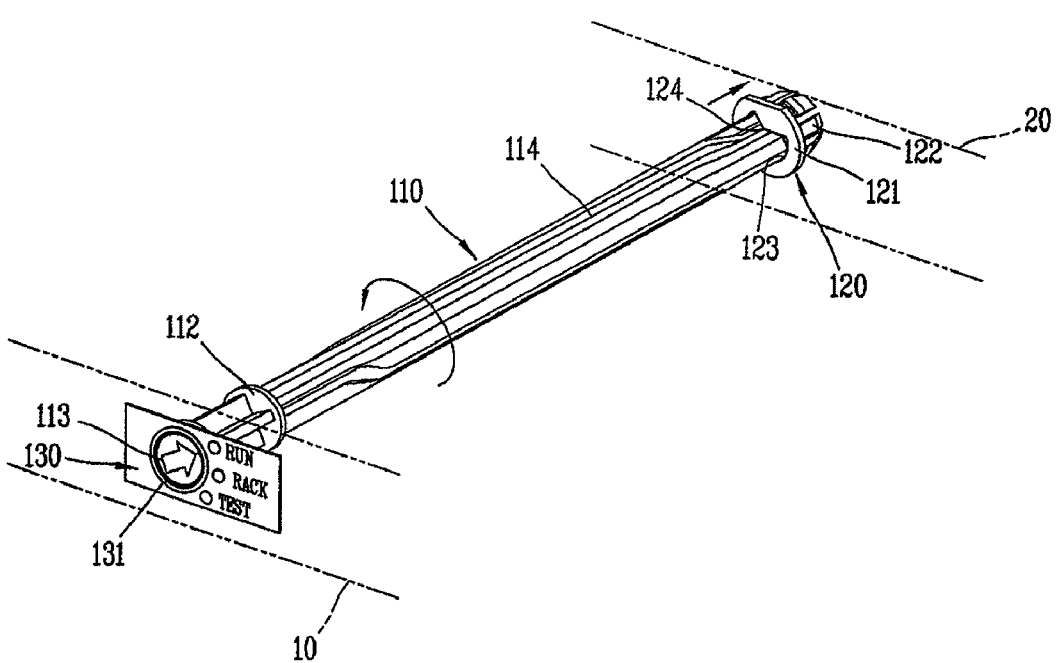

FIGS. 1 and 2 are perspective views showing a carriage including a run/test position indicator device according to an exemplary embodiment of the present invention, FIG. 3 is a perspective view showing a state of the run/test position indicator device when the main body of the carrier becomes away from a girder, FIG. 4 is an exploded perspective view of a major part of the run/test position indicator device in FIG. 1, and FIGS. 5 to 7 illustrate the operations of the run/test position indicator device in FIG. 1.

With reference to FIGS. 1 to 4, the run/test position indicator device of a vacuum circuit breaker according to an exemplary embodiment of the present invention includes: a position indication cam 110 installed between a girder 10, a fixed body, and a carriage main body 20, a moving body, a cam holder 120 provided at the carriage main body 20 such that the position indication cam 110 can be slidably inserted therein, and rotating the position indication cam 110 at a certain angle according to a change in the space between the girder 10 and the carriage main body 20, and a position indication member 130 having a mark symbol to allow the position indication cam 110 rotatably coupled therewith to indicate a run/test position between a circuit breaker main body a cradle.

The position indication cam 110 is formed to have such a lengthy bar-like shape that its both ends are maintained to be coupled between the girder 10 and the carriage main body 20 at a time point when the circuit breaker main body is completely withdrawn, namely, when the girder 10 and the carriage main body 20 reach to a position from which they are completely separated.

The position indication cam 110 includes a plurality of fixed protrusions 111 and 112 formed at certain intervals at one side portion, namely, at the portion which is inserted into the girder 10, and tightly attached to facing surfaces of a front plate and a rear plate of the girder 10 to constrain the position indication cam 110 in a lengthwise direction.

The position indication cam 110 includes an indication part 113 formed on a front side, namely, on a surface of an end portion exposed from the front side of the girder 10. The indication part 113 allows a current location of the circuit breaker to be recognized. An arrow may be displayed on the indication part 113 so as to be combined with a mark symbol of the position indication member 130 as shown in the drawing, or a dot or any other indication-available form may be displayed on the indication part 113.

The position indication cam 110 includes a guiding unit 114 formed along a lengthwise direction from the fixed protrusion positioned at a rear side, among the fixed protrusions, to an end of the rear side. The guiding unit 114 is coupled with the cam holder 120 and allows the position indication cam 110 to be rotated in units of certain intervals. The guiding unit 114 may include a plurality of protuberances formed in a lengthwise direction and having a V-like sectional shape as shown in the drawing.

The guiding unit 114 includes a plurality of first guiding units formed along the lengthwise direction of the position indication cam 110 and one or more second guiding units formed between the first guiding units and slopingly connecting the first guiding units such that they have a phase difference.

The first guiding unit includes a test section 114a that can indicate a state in which the circuit breaker main body reaches a 'test position', a rack section 114b that can indicate a state in which the circuit breaker main body is moving from the 'test position' to a 'run position', and a run section 114c that can indicate a state in which the circuit breaker main body has reached the 'run position'.

The second guiding unit includes a first variable section 114d at which the circuit breaker main body has a phase change, namely, is rotated at a certain angle, when it passes from the test section 114a to the rack section 114b, and a second variable section 114e at which the circuit breaker main body is rotated when it passes from the rack section 114b to the run section 114c.

The cam holder 120 includes a body part 121 formed to have an annular shape, and a fixed part 122 formed to be protruded from one side of the body part 121 and hook-inserted into a hole provided on the carriage main body 20 so as to be fixed. The fixed part 122 includes a plurality of fixed pieces formed to be divided along a circumferential direction of the body part 121. An outer circumferential surface of each fixed piece may have a stopping protrusion.

The body part 121 includes a sliding part 123 penetratingly formed to allow the position indication cam 110 to be slidably inserted therein, and a constraining part 124 formed to be protruded from a portion of an inner circumferential surface of the sliding part 123 and having a wedge-like shape to prevent the guiding part 114 of the position indication cam 110 inserted in the body part 121 from being rotated.

Here, preferably, the cam holder 120 and the position indication cam 110 are made of a material, such as a plastic material, that can prevent frication abrasion.

Meanwhile, the position indication member 130 may be formed to have a certain rigidity such as a plate, or may be formed as a sticker that may be attached to a front face of the girder 10. A through hole 131 is formed at the center of the position indication member 130 to allow the indication part 113 of the position indication cam 110 to pass therethrough. Mark symbols such as 'TEST', 'RACK', and 'RUN' may be indicated near the through hole 131.

Reference numerals 30 and 40 denote a lead screw and a nut assembly for moving the carriage main body, and 50 denotes a driving handle.

The operational effect of the run/test position indicator device of a vacuum circuit breaker according to an exemplary embodiment of the present invention is as follows.

First, in order to move the circuit breaker main body to a test position with respect to the cradle, the operator lifts an interlock link (not shown) provided at the circuit breaker main body and, at the same time, pushes the circuit breaker main body, to make the interlock link mounted in a test position determining recess of an interlock plate (not shown) provided at the cradle. Then, a main line terminal and a load terminal of the circuit breaker main body are separated from a main line and a load terminal of the cradle, so only an operation test of the vacuum circuit breaker can be performed. In this case, the girder 10 is positioned near the carriage main body 20. Namely, the cam holder 120 is positioned at the test section 114a of the first guiding part of the position indication cam 110. Then, the arrow indexed on the indication part 113 of the position indication cam 110 indicates 'TEST' among the mark indications of the position indication member 130.

Next, in order for the operator to move the circuit breaker main body to the run position with respect to the cradle, so-called withdrawing and inserting operations are performed. Namely, when the operator rotates the lead screw 30 by using the driving handle 50, the circuit breaker main body is linearly moved to become near to the cradle by the lead screw 30 and the nut assembly 40. Then, the position indication cam 110 is slidably released from the cam holder 120. And from a time point when the constraining part 124 of the cam holder 120 gets out of the test section 114a of the position indication cam 110, namely, a time point when the constraining part 124 enters the first variable section 114d, to a time point when the first variable section 114d ends, the position indication cam 110 is rotated. Then, the arrow on the indication part 114 of the position indication cam 110 is rotated to indicate 'RACK'. The 'RACK' mark is continuously indicated while the carriage main body 20 is moved as long as the rack section with respect to the girder 10, namely, while the constraining part 124 of the cam holder 120 is positioned at the rack section 114b of the position indication cam 110.

And then, in order to move the circuit breaker main body to the run position at which the circuit breaker main body is completely tightly attached with the cradle, he rotates the lead screw 30 by using the driving handle 50. Then, the circuit breaker body becomes more near to the cradle and the position indication cam 110 is slid to be released from the circuit breaker main body, namely, from the cam holder 120. In this process, while the cam holder 120 passes through the second variable section 115e of the position indication cam 110, the position indication cam 110 is further rotated, so the indication. part 113 indicates 'RUN'. Namely, it indicates a state in which the circuit breaker main body is completely tightly attached to the cradle.

Meanwhile, while the circuit breaker main body is being withdrawn from the cradle and moved to the test position, the position indication cam 110 is rotated in the opposite direction of the insertion direction with respect to the cam holder 120 to indicate the location of the circuit breaker main body along with the mark symbol of the indication member 130 in real time.

As so far described, when inserting or withdrawing the circuit breaker main body into or from the cradle, the operator can discriminate the location of the circuit breaker main body in real time, whereby an execution location of the vacuum circuit breaker can be quickly and accurately recognized.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A run/test position indicator device of a vacuum circuit breaker, the device comprising:
    a position indication cam installed between a girder, a fixed body, and a main body of a carriage, a moving body, and rotating at a certain angle according to a change in the space between the girder and the main body of the carriage; and
    an indication member, to which the position indication cam is rotatably coupled, having a mark symbol to allow the position indication cam to indicate a run and test position of a main body of circuit breaker;
    wherein the position indication cam is configured to be rotated in units of certain intervals along a lengthwise direction; and
    wherein the position indication cam comprises a guiding unit for constraining a rotation by the main body of the carriage.

2. The run/test position indicator device of claim 1, wherein the guiding unit comprises:
    a plurality of first guiding units formed along a lengthwise direction of the position indication cam; and
    one or more second guiding units formed between the first guiding units and slopingly connecting the first guiding units such that they have a phase difference.

3. The run/test position indicator device of claim 2, wherein a cam holder is coupled with the main body of the carriage, in which the guiding unit of the position indication cam is inserted to allow the position indication cam to be slidably rotated.

4. The run/test position indicator device of claim 3, wherein the cam holder comprises a sliding part formed in a penetrating manner to allow the position indication cam to be inserted and slid.

5. The run/test position indicator device of claim 4, wherein a restraining part is formed on an inner circumferential surface of the sliding part and coupled with the guiding unit of the position indication cam to restrain a rotation.

6. The run/test position indicator device of claim 3, wherein the cam holder comprises a fixed part hook-coupled to the main body of the carriage.

7. The run/test position indicator device of claim 6, wherein the fixed part includes a plurality of fixed pieces divided along a circumferential direction.

8. The run/test position indicator device of claim 7, wherein a stopping protrusion is formed on an outer circumferential surface of each of the fixed pieces.

9. The run/test position indicator device of claim 1, wherein the position indication cam has such as length that both ends thereof are maintained to be in a state of being coupled between the girder and the main body of the carriage even when the girder and the main body of the carriage reach a position at which they are completely separated.

10. The run/test position indicator device of claim 9, wherein the position indication cam includes a plurality of fixed protrusions formed at certain intervals so that the position indication cam can be constrained in a lengthwise direction.

11. The run/test position indicator device of claim 10, wherein the fixed protrusions are formed to be tightly attached to facing surfaces of a front plate and a rear plate provided at the girder at a region where the fixed protrusions are inserted into the girder.

12. The run/test position indicator device of claim 9, wherein the position indication cam comprises an indication part formed on the surface of an end portion exposed from a front surface of the girder to allow a current location of the circuit breaker to be recognized.

13. A run/test position indicator device of a vacuum circuit breaker, the device comprising:

a position indication cam installed between a girder, a fixed body, and a main body of a carriage, a moving body, and rotating at a certain angle according to a change in the space between the girder and the main body of the carriage; and an indication member, to which the position indication cam is rotatably coupled, having a mark symbol to allow the position indication cam to indicate a run and test position of a main body of circuit breaker;

wherein the position indication cam has such as length that both ends thereof are maintained to be in a state of being coupled between the girder and the main body of the carriage even when the girder and the main body of the carriage reach a position at which they are completely separated.

14. The run/test position indicator device of claim 13, wherein the position indication cam includes a plurality of fixed protrusions formed at certain intervals so that the position indication cam can be constrained in a lengthwise direction.

15. The run/test position indicator device of claim 14, wherein the fixed protrusions are formed to be tightly attached to facing surfaces of a front plate and a rear plate provided at the girder at a region where the fixed protrusions are inserted into the girder.

16. The run/test position indicator device of claim 13, wherein the position indication cam comprises an indication part formed on the surface of an end portion exposed from a front surface of the girder to allow a current location of the circuit breaker to be recognized.

* * * * *